(12) United States Patent
Lai et al.

(10) Patent No.: US 11,175,720 B2
(45) Date of Patent: Nov. 16, 2021

(54) POWER CONTROL DEVICE, COMPUTER SYSTEM, AND POWER CONTROL METHOD THEREOF

(71) Applicant: Wistron Corporation, New Taipei (TW)

(72) Inventors: Liang-Yu Lai, New Taipei (TW); Meng-Che Lian, New Taipei (TW); Yun-Lin Tsai, New Taipei (TW); Chun-Lung Hsiao, New Taipei (TW)

(73) Assignee: Wistron Corporation, New Taipei (TW)

( * ) Notice: Subject to any disclaimer, the term of this patent is extended or adjusted under 35 U.S.C. 154(b) by 64 days.

(21) Appl. No.: 16/666,415

(22) Filed: Oct. 29, 2019

(65) Prior Publication Data

US 2021/0055779 A1 Feb. 25, 2021

(30) Foreign Application Priority Data

Aug. 19, 2019 (TW) .................... 108129472

(51) Int. Cl.
  *G06F 1/00* (2006.01)
  *G06F 1/3246* (2019.01)
  *G06F 1/3203* (2019.01)
(52) U.S. Cl.
  CPC .......... *G06F 1/3246* (2013.01); *G06F 1/3203* (2013.01)
(58) Field of Classification Search
  CPC ..................................................... G06F 1/3246
  USPC ........................................................ 713/323
  See application file for complete search history.

(56) References Cited

U.S. PATENT DOCUMENTS

| 2003/0011972 | A1* | 1/2003 | Koo ..................... G06F 1/1616 361/679.27 |
| 2006/0075286 | A1* | 4/2006 | Hodge ................ G06F 11/2268 714/5.11 |
| 2007/0050473 | A1* | 3/2007 | Lee ....................... G06F 1/3203 709/217 |
| 2007/0061564 | A1* | 3/2007 | Park ....................... G06F 9/441 713/100 |
| 2013/0097444 | A1* | 4/2013 | Hoagland ............. G06F 1/3206 713/323 |
| 2014/0215248 | A1* | 7/2014 | Cheng ................... G06F 1/3234 713/323 |
| 2014/0354079 | A1* | 12/2014 | Bailey ..................... G06F 1/26 307/116 |
| 2015/0029096 | A1* | 1/2015 | Ishihara ........... H04N 21/42201 345/156 |
| 2019/0285960 | A1* | 9/2019 | Sasa ....................... G02C 7/101 |

FOREIGN PATENT DOCUMENTS

TW    I650527 B    2/2019

* cited by examiner

*Primary Examiner* — Volvick Derose
(74) *Attorney, Agent, or Firm* — Winston Hsu

(57) ABSTRACT

A power control device for a computer system includes a detecting module, configured to detect an open/close state of a display device to generate an open/close signal; and a controller, coupled to the detecting module and coupled to a power supply device through a system management bus, configured to generate an enabling signal to conduct or block a power source of the computer system provided by the power supply device, and to wake up the power supply device, which is in a power saving mode, according to the open/close signal.

9 Claims, 3 Drawing Sheets

POWER CONTROL DEVICE, COMPUTER SYSTEM, AND POWER CONTROL METHOD THEREOF

BACKGROUND OF THE INVENTION

1. Field of the Invention

The present invention relates to a power control method, a computer system, and a power control method thereof, and more particularly, to a power control method, computer system and power control method thereof capable of reducing power consumption using existing elements of the computer system.

2. Description of the Prior Art

With the advancement and development of technology, reducing power consumption of electronic devices is a common goal. Before shipment, a computer system of a conventional notebook computer is required to enter a power save mode for reducing power consumption and preventing a battery of the notebook computer being exhausted resulted in data loss of Complementary Metal-Oxide-Semiconductor (CMOS) of the computer system during the shipment or not in duty for a long time. In order to achieve this, an embedded controller (EC) is included in the conventional computer system to directly switch the computer system between a low power consumption mode and a normal mode using an external logic circuit, e.g. a D-type Flip-flop, according to an open/close state of a display device of the computer system. The external logic circuit must be connected to the embedded controller, which not only increases manufacturing costs but also increases power consumption of the computer system. Therefore, improvements are needed to the prior art.

SUMMARY OF THE INVENTION

The present invention provides a power control device, computer system and power control method thereof to switch power control modes of the computer system using existing elements of the computer system to reduce circuitry costs and power consumption of the computer system.

An embodiment of the present invention discloses a power control device for a computer system, comprising: a detecting module, configured to detect an open/close state of a display device to generate an open/close signal; and a controller, coupled to the detecting module and coupled to a power supply device through a system management bus, configured to generate an enabling signal to conduct or block a power source of the computer system provided by the power supply device, and to wake up the power supply device, which is in a power saving mode, according to the open/close signal.

Another embodiment of the present invention discloses a computer system, comprising: an operation circuit; a display device; a power supply device, configured to drive the operation circuit; and a power control device, comprising: a detecting module, configured to detect an open/close state of the display device to generate an open/close signal; and a controller, coupled to the detecting module and coupled to the power supply device through a system management bus, configured to generate an enabling signal to conduct or block a power source of the computer system provided by the power supply device, and to wake up the power supply device, which is in a power saving mode, according to the open/close signal.

Another embodiment of the present invention discloses a power control method, for a computer system, comprising: detecting an open/close state of a display device to generate an open/close signal; generating an enabling signal to conduct or block a power source of the computer system provided by a power supply device; and waking up the power supply device, which is in a power saving mode, according to the open/close signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
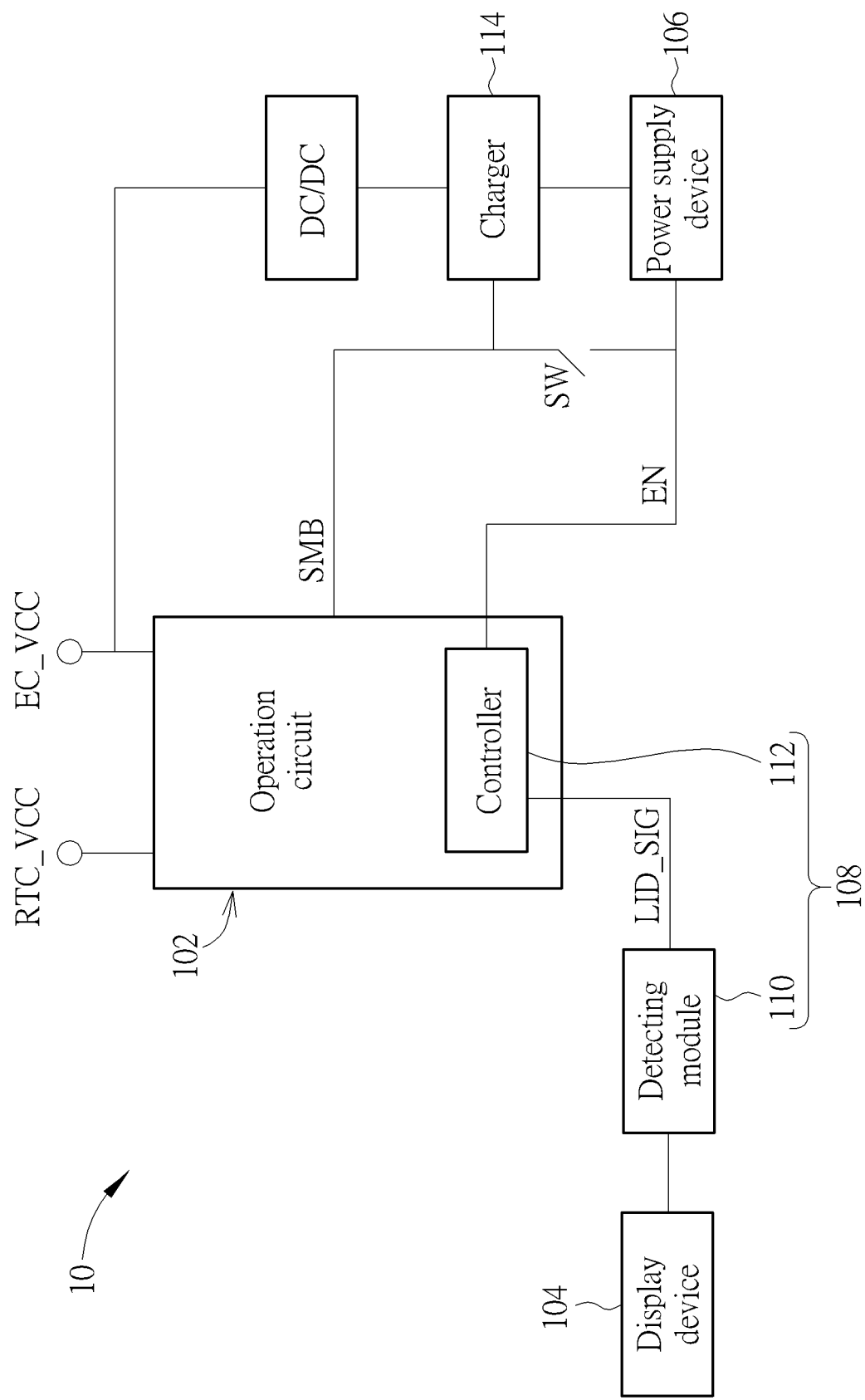
FIG. 1 is a schematic diagram of a computer system according to an embodiment of the present invention.

Refer to FIG. 1, which is a schematic diagram of a computer system 10 according to an embodiment of the present invention. The computer system 10 includes an operation circuit 102, a display device 104, a power supply device 106 and a power control device 108. The computer system 10 may be a notebook computer or an electronic device with a folded screen. The operation circuit 102 may include a motherboard, hard disk, central processing unit (CPU) or memory to execute most functions of the computer system 10, such that the computer system 10 operates normally when powered-on. The display device 104 may be a display screen on the notebook computer, which is opened or closed by folding. The power supply device 106 may be a charging battery of the notebook computer. The power control device 108 includes a detecting module 110 and a controller 112, wherein the detecting module 110 may be a sensor for sensing an open/close state of the display device 104 to generate an open/close signal LID_SIG. The controller 112 is coupled to the detecting module 110 and coupled to the power supply device 106 through a system management bus SMB, configured to generate an enabling signal EN to control a switch SW to conduct or block a power source to the operation circuit 102 provided by the power supply device 106, and to wake up the power supply device 106, which is in a power saving mode, according to the open/close signal LID_SIG. In this embodiment, the computer system 10 may further include a charger 114 coupled to a DC/DC power source to charge the power supply device 106, or the power source of the operation circuit 102 may be directly provided by the system management bus SMB. In addition, the operation circuit 102 of the computer system 10 is coupled to a real-time clock voltage source RTC_VCC and a second voltage source EC_VCC, wherein the second voltage source EC_VCC is utilized for providing the power source for the operation circuit 102 when the computer system 10 is in a normal mode. Notably, since the controller 112 may be an existing element of the operation circuit 102 in the computer system 10, the computer system 10 of the present invention may detect the open/close state of the display device 10 by the detecting module 110 of the power control device 108; the controller 112 may then switch a power supply mode of the power supply device 106 based on the open/close state of the display device 104. In other words, the power control device 108 of the present invention does not comprise an external logic circuit, and is capable of controlling a power consumption mode of the computer system 10 in a timing sequence, which can reduce manufacturing costs and power consumption of the computer system 10.

Figure 2:
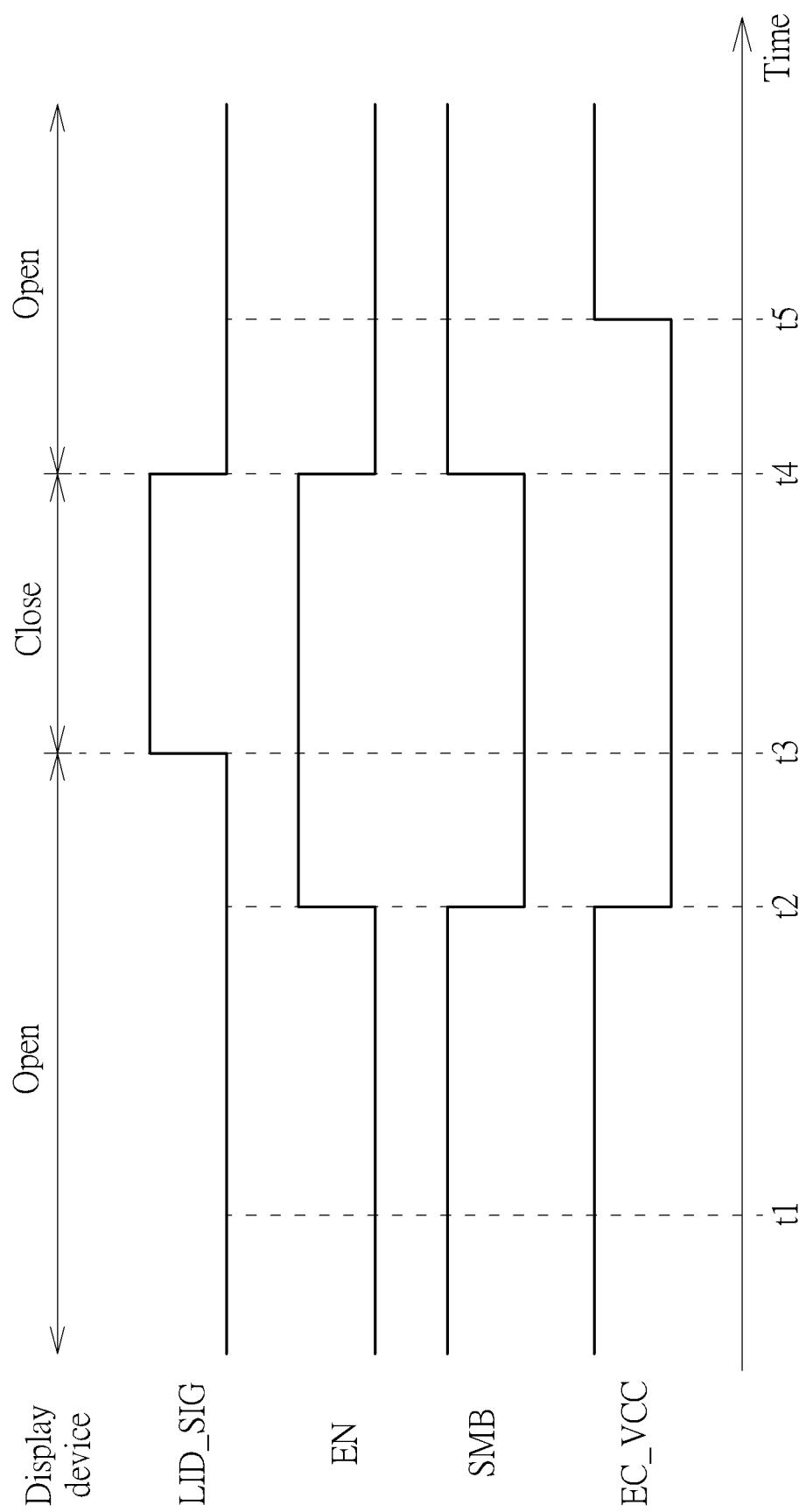
FIG. 2 is a timing diagram of a mode transition of the computer system according to an embodiment of the present invention.

Refer to FIG. 2, which is a timing diagram of a mode transition of the computer system 10 according to an embodiment of the present invention. When the computer system 10 is finished and ready for shipment at time t1, the computer system 10 enters a power saving mode by setting a program command, e.g. a low power mode (LPC); meanwhile since the open/close state of the display device 104 is still open, the open/close signal LID_SIG and the enabling signal EN are both at a low voltage level, and the second voltage source EC_VCC and the system management bus SMB of the operation circuit 102 are both at a high voltage level. At time t2, in order to ensure that the power supply device 106 of the computer system 10 enters the power saving mode, the controller 112 is configured to set a bit mask for the enabling signal EN. In this example, the bit mask is bit 1, and the controller 112 is configured to pull the enabling signal EN to the high voltage such that the power supply device 106 enters the power saving mode. In addition, when the system management bus SMB is at the high voltage level, the switch SW is conductive and the power supply device 106 will not enter the power saving mode. Therefore, at time t2, the enabling signal EN is transformed from the low voltage level to the high voltage level, which turns off the switch SW to stop the power source from entering the power supply device 106. At the same time, the second voltage source EC_VCC and the system management bus SMB of the operation circuit 102 are both transformed from the high voltage level to the low voltage level to ensure that the power supply device 106 of the computer system 10 enters the power saving mode. Notably, at time t2, the power supply device 106 of the computer system 10 is already in the power saving mode.

Then, when the open/close state of the display device 104 of the computer system 104 is closed at time t3, the controller 112 clears the bit mask of the enabling signal EN. Meanwhile, the open/close signal LID_SIG and the enabling signal EN are both at the high voltage level, and the second voltage source EC_VCC and the system management bus SMB of the operation circuit 102 are both at the low voltage level.

At time t4, the display device 104 is opened. The controller 112 wakes up the power supply device 106 from the power saving mode according to the open/close signal LID_SIG. At this time, the open/close signal LID_SIG and the enabling signal EN are both transformed from the high voltage level to the low voltage level, and the system management bus SMB is transformed from the low voltage level to the high voltage level. Since the computer system 10 exits the power saving mode at time t4, the second voltage source EC_VCC of the operation circuit 102 is delayed for a period of time and transformed to the normal mode at time t5. Therefore, at time t5, the second voltage source EC_VCC of the operation circuit 102 is transformed from the low voltage level to the high voltage level.

The embodiments above detail that the computer system may wake up the computer system using existing elements, thereby achieving the same logic control functions without external logic circuits. This simplifies the circuit, reduces circuitry costs and reduces overall power consumption of the computer system. Moreover, those skilled in the art may properly design the computer system according to different system requirements, e.g. the detecting module or the switch for conducting the operation circuit and the power supply device may be replaced by other circuit elements. These modifications are also applicable to the present invention and not limited to the illustrated examples.

Figure 3:
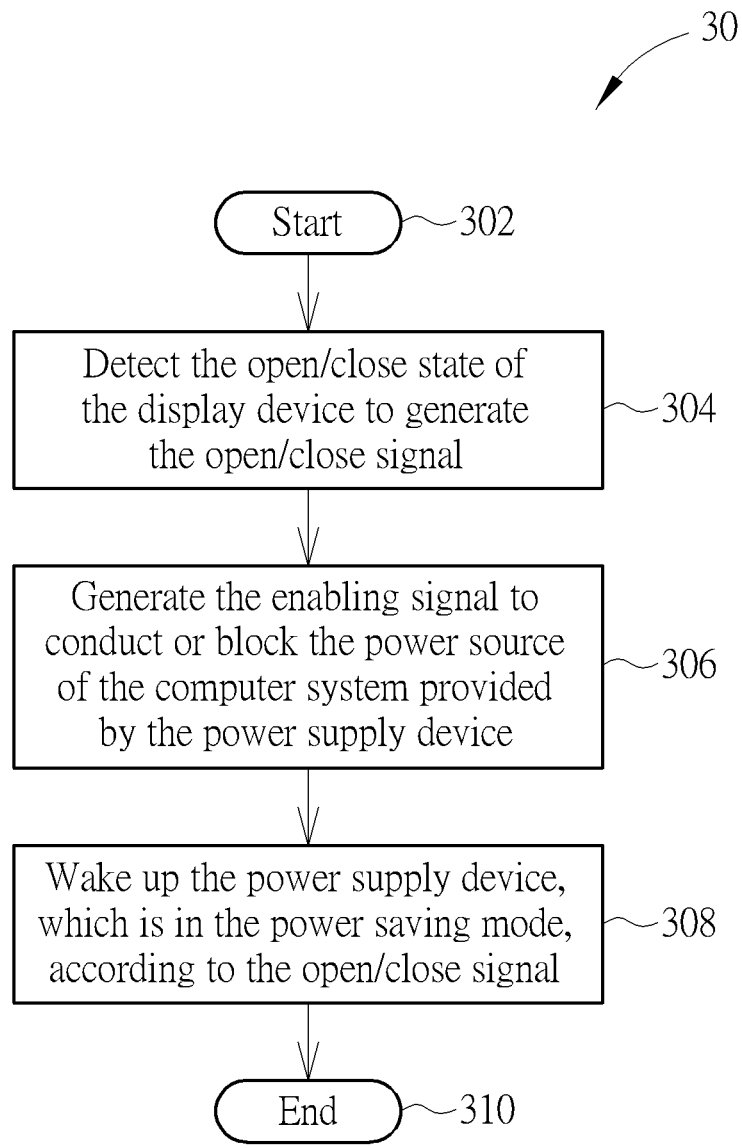
FIG. 3 is a schematic diagram of a power control process according to an embodiment of the present invention.

An operation method of the computer system 10 may be illustrated by a control process 30, as shown in FIG. 3. The control process 30 includes the following steps:

Step 302: Start.

Step 304: Detect the open/close state of the display device 104 to generate the open/close signal LID_SIG.

Step 306: Generate the enabling signal EN to conduct or block the power source of the computer system 10 provided by the power supply device 106.

Step 308: Wake up the power supply device 106, which is in the power saving mode, according to the open/close signal LID_SIG.

Step 310: End.

Further details regarding the operation of the power control process 30 are provided by the embodiments of the computer system 10 above, and are not narrated here for brevity.

In summary, the present invention provides a power control method, computer system and power control method thereof, which can switch power control modes of the computer system in a timing sequence using existing elements of the computer system to reduce circuitry costs and power consumption of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power control device for a computer system, comprising:
    a detecting module, configured to detect an open/close state of a display device to generate an open/close signal; and
    a controller, coupled to the detecting module and coupled to a power supply device through a system management bus, configured to generate an enabling signal to conduct or block a power source of the computer system provided by the power supply device, and to wake up the power supply device, which is in a power saving mode, according to the open/close signal;
    wherein the controller is configured to pull high a voltage level of the enabling signal such that the power supply device enters the power saving mode, and a bit mask is set to ensure that the power supply device is in the power saving mode;
    wherein when the power supply device is in the power saving mode and the open/close state indicates that the display device is closed from opening, the bit mask is cleared.

2. The power control device of claim 1, wherein when the open/close state indicates that the display device is opened from closing, the controller is configured to wake up the power supply device, which is in the power saving mode, according to the open/close signal.

3. The power control device of claim 1, wherein the enabling signal is generated by a program command.

4. A computer system, comprising:
    an operation circuit;

a display device;

a power supply device, configured to drive the operation circuit; and a power control device, comprising:

a detecting module, configured to detect an open/close state of the display device to generate an open/close signal; and a controller, coupled to the detecting module and coupled to the power supply device through a system management bus, configured to generate an enabling signal to conduct or block a power source of the computer system provided by the power supply device, and to wake up the power supply device, which is in a power saving mode, according to the open/close signal;

wherein the controller is configured to pull high a voltage level of the enabling signal such that the power supply device enters the power saving mode, and a bit mask is set to ensure that the power supply device is in the power saving mode;

wherein when the power supply device is in the power saving mode and the open/close state indicates that the display device is closed from opening, the bit mask is cleared.

5. The computer system of claim 4, wherein when the open/close state indicates that the display device is opened from closing, the controller is configured to wake up the power supply device, which is in the power saving mode, according to the open/close signal.

6. The computer system of claim 4, wherein the enabling signal is generated by a program command.

7. A power control method, for a computer system, comprising:

detecting an open/close state of a display device to generate an open/close signal;

generating an enabling signal to conduct or block a power source of the computer system provided by a power supply device; and waking up the power supply device, which is in a power saving mode, according to the open/close signal;

wherein the controller is configured to pull high a voltage level of the enabling signal such that the power supply device enters the power saving mode, and a bit mask is set to ensure that the power supply device is in the power saving mode;

wherein when the power supply device is in the power saving mode and the open/close state indicates that the display device is closed from opening, the bit mask is cleared.

8. The power control method of claim 7, wherein when the open/close state indicates that the display device is opened from closing, the controller is configured to wake up the power supply device, which is in the power saving mode, according to the open/close signal.

9. The power control method of claim 7, wherein the enabling signal is generated by a program command.

* * * * *